United States Patent
Bhaumik et al.

(10) Patent No.: US 12,536,564 B2
(45) Date of Patent: Jan. 27, 2026

(54) METHOD AND SYSTEM FOR GESTURE-BASED CROSS CHANNEL COMMERCE AND MARKETING

(71) Applicant: TRANSFORM SR BRANDS LLC, Hoffman Estates, IL (US)

(72) Inventors: Vijan Bhaumik, Bloomingdale, IL (US); Shubham Agarwal, Arlington Heights, IL (US)

(73) Assignee: TRANSFORM SR BRANDS LLC, Hoffman Estates, IL (US)

( * ) Notice: Subject to any disclaimer, the term of this patent is extended or adjusted under 35 U.S.C. 154(b) by 0 days.

(21) Appl. No.: 18/613,925

(22) Filed: Mar. 22, 2024

(65) Prior Publication Data
US 2024/0232949 A1    Jul. 11, 2024

Related U.S. Application Data

(63) Continuation of application No. 16/921,105, filed on Jul. 6, 2020, now Pat. No. 12,002,071, which is a continuation of application No. 14/036,359, filed on Sep. 25, 2013, now Pat. No. 10,713,688.

(51) Int. Cl.
*G06Q 30/00* (2023.01)
*G06Q 30/0251* (2023.01)
*G05B 19/418* (2006.01)

(52) U.S. Cl.
CPC .............. *G06Q 30/0269* (2013.01)

(58) Field of Classification Search
CPC ................................ G06Q 30/0269
See application file for complete search history.

(56) References Cited

U.S. PATENT DOCUMENTS

| 2010/0030578 A1 | 2/2010 | Siddique |
| 2010/0042421 A1 | 2/2010 | Bai et al. |
| 2010/0257060 A1 | 10/2010 | Kountis |

(Continued)

OTHER PUBLICATIONS

"Smart Signage: A Draggable Cyber-Physical Broadcast/Multicast Media System". IEEE. 2013 (Year: 2013).*

(Continued)

*Primary Examiner* — Maria V Vanderhorst
(74) *Attorney, Agent, or Firm* — McAndrews, Held & Malloy, Ltd.

(57) ABSTRACT

A computing device (e.g., a server) coupled to a digital signage device may receive characteristic information associated with a visitor of the digital signage device. The received characteristic information may be analyzed, and based on a result of the analysis, advertisement attributes may be determined. The computing device may select, based on the determined advertisement attributes, a particular advertisement from a plurality of advertisement bids. The computing device may cause display of the selected particular advertisement on the digital signage device for the visitor. The characteristic information may be generated by the digital signage device utilizing a video analytics. The computing device may receive particular gesture information associated with a mobile device of the visitor who responds to the displayed particular advertisement. The computing device may cause a cloud computing platform to push content associated with the particular advertisement into the mobile device for the visitor to place an order.

20 Claims, 6 Drawing Sheets

(56) References Cited

U.S. PATENT DOCUMENTS

| | | | |
|---|---|---|---|
| 2011/0035282 A1 | 2/2011 | Spatscheck et al. | |
| 2011/0143811 A1* | 6/2011 | Rodriguez | H04N 1/00244 |
| | | | 455/556.1 |
| 2012/0030006 A1 | 2/2012 | Yoder | |
| 2012/0046071 A1 | 2/2012 | Brandis | |
| 2012/0215610 A1 | 8/2012 | Amaro | |
| 2013/0005443 A1 | 1/2013 | Kosta | |
| 2013/0110666 A1* | 5/2013 | Aubrey | G06V 40/103 |
| | | | 705/26.5 |
| 2013/0318546 A1 | 11/2013 | Kothuri et al. | |
| 2013/0335310 A1 | 12/2013 | Whitney | |
| 2014/0062857 A1 | 3/2014 | She et al. | |
| 2014/0085179 A1 | 3/2014 | Krig et al. | |
| 2014/0095306 A1* | 4/2014 | Avalos | G06Q 30/0269 |
| | | | 705/14.53 |
| 2014/0172557 A1 | 6/2014 | Eden et al. | |
| 2014/0176436 A1 | 6/2014 | Raffa et al. | |
| 2017/0272654 A1 | 9/2017 | Poindexter, Jr. | |
| 2019/0121522 A1 | 4/2019 | Davis | |

OTHER PUBLICATIONS

"SQEAK: A Mobile Multi Platform Phone and Networks Gesture Sensor". IEEE. 2008. (Year: 2008).*
A Design Space for Pervasive Advertising on Public Displays, by Florian Alt. Ph.D. Dissertation, 2012 (Year: 2012).

* cited by examiner

METHOD AND SYSTEM FOR GESTURE-BASED CROSS CHANNEL COMMERCE AND MARKETING

CROSS-REFERENCE TO RELATED APPLICATIONS/INCORPORATION BY REFERENCE

The present application is a continuation of U.S. application Ser. No. 16/921,105, filed Jul. 6, 2020, which is a continuation of U.S. application Ser. No. 14/036,359, filed Sep. 25, 2013 (U.S. Pat. No. 10,713,688). Each of the above-referenced applications is hereby incorporated herein by reference in its entirety.

FIELD OF THE DISCLOSURE

Certain embodiments of the disclosure relate to advertisements using digital signage. More specifically, certain embodiments of the disclosure relate to a method and system for gesture-based cross channel commerce and marketing.

BACKGROUND OF THE DISCLOSURE

Existing methods and systems for commerce and marketing using digital signage or signs may be ineffective.

Further limitations and disadvantages of conventional and traditional approaches will become apparent to one of skill in the art, through comparison of such systems with the present disclosure as set forth in the remainder of the present application with reference to the drawings.

BRIEF SUMMARY OF THE DISCLOSURE

A system and/or method for gesture-based cross channel commerce and marketing, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION OF THE DISCLOSURE

Figure 1:
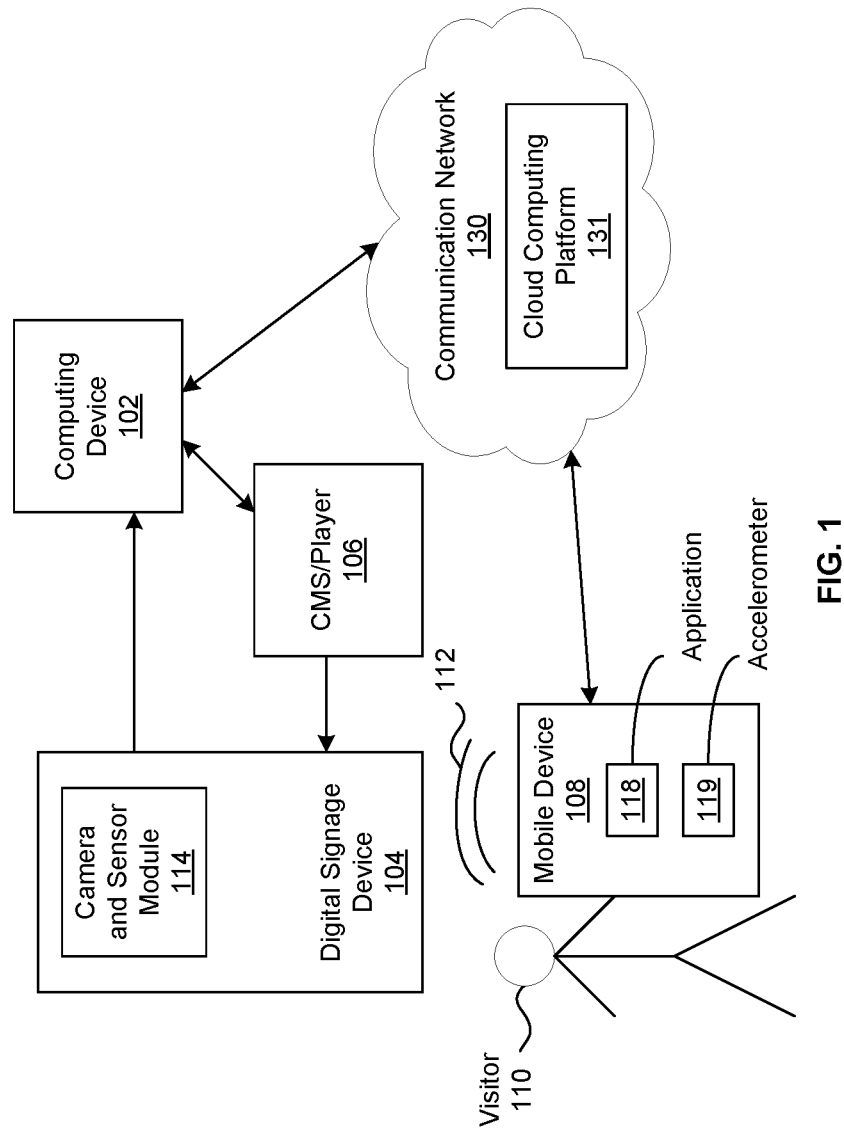
FIG. 1 is a block diagram illustrating an example digital signage system that is operable to provide gesture-based cross channel commerce and marketing, in accordance with an example embodiment of the disclosure.

As utilized herein the terms "circuit" and "circuitry" refer to physical electronic components (i.e. hardware) and any software and/or firmware ("code") which may configure the hardware, be executed by the hardware, and/or otherwise be associated with the hardware. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, a device/module/circuitry/etc. is "operable" to perform a function whenever the device/module/circuitry/etc. comprises the necessary hardware and code (if any is necessary) to perform the function, regardless of whether performance of the function is disabled, or not enabled, by some user-configurable setting.

Certain embodiments of the disclosure can be found in a method and system for gesture-based cross channel commerce and marketing. In various embodiments of the disclosure, a computing device operatively coupled to a digital signage device may be operable to receive, from the digital signage device, characteristic information associated with a visitor of the digital signage device. The received characteristic information may be analyzed by the computing device, and based on a result of the analysis of the characteristic information, advertisement attributes may be determined. The computing device may be operable to select, based on the determined advertisement attributes, a particular advertisement from among a plurality of advertisement bids. The computing device may then be operable to cause display of the selected particular advertisement on the digital signage device for the visitor. In this regard, the characteristic information associated with the visitor may comprise, for example, one or more of the following: demographic information of the visitor, behavioral information of the visitor, and location information of the visitor in a field-of-view captured by the digital signage device. The characteristic information may be generated by the digital signage device utilizing, for example, a video analytics on video images captured by the digital signage device.

In an example embodiment of the disclosure, the computing device may be operable to receive, from the digital signage device, particular gesture information associated with a mobile device of the visitor who may respond to the displayed particular advertisement. The computing device may be operable to communicate, based on the received particular gesture information, to a cloud computing platform for causing the cloud computing platform to obtain location information and particular profile information associated with the mobile device, from the mobile device. Based on the obtained location information and the particular profile information, the cloud computing platform may be operable to push content associated with the displayed particular advertisement into the mobile device for the visitor to place an order on the mobile device or for the mobile device to automatically complete a transaction utilizing a particular application running on the mobile device. In this regard, the gesture information associated with the mobile device may be generated by the digital signage device utilizing a video analytics on video images captured by the digital signage device. The gesture information associated with the mobile device may comprise, for example, information on one or more motion-based gestures inputted to the mobile device. In such instances, the mobile device may detect the one or more motion-based gestures utilizing an accelerometer in the mobile device, and communicate, based on the detecting of the one or more motion-based gestures, the location information and the particular profile information to the cloud computing platform, utilizing the particular application running on the mobile device.

In an example embodiment of the disclosure, the computing device may be operable to perform testing which may comprise (1) receiving, from the digital signage device, action information associated with the visitor who views a first version of the displayed particular advertisement, (2) analyzing statistically the received action information associated with the first version of the particular advertisement and other received action information associated with the first version as well as associated with one or more other versions of the particular advertisement, and (3) determining, based on a result of the analysis of the action information, a particular version among the first version and the one or more other versions for display on the digital signage device when the particular advertisement may be later scheduled to display. In this regard, the action information which is statistically analyzed may comprise one or more of audience impression, viewing time, viewer facial gesture and viewer interaction. The action information may be generated by the digital signage device utilizing one or both of (1) a video analytics on video images captured by the digital signage device and (2) a tracking on sensor information captured by the digital signage device.

FIG. 1 is a block diagram illustrating an example digital signage system that is operable to provide gesture-based cross channel commerce and marketing, in accordance with an example embodiment of the disclosure. Referring to FIG. 1, there is shown a digital signage system 100. The system 100 may comprise a digital signage device 104, a computing device 102, a CMS/player 106 and a communication network 130, for example. The digital signage device 104 may comprise an integrated camera and sensor module 114. The communication network 130 may comprise a cloud computing platform 131. There is also shown, in FIG. 1, a visitor 110 of the digital signage device 104 and a mobile device 108 of the visitor 110. The mobile device 108 may comprise, for example, an accelerometer 119 and a particular application 118 running on the mobile device 108.

The digital signage device 104 may comprise suitable logic, circuitry, interfaces and/or code that may be operable to show programmed content such as, for example, advertisements. The digital signage device 104 may be in a form of LCD, LED or plasma displays, and may be placed in both public and private environments, including retail store locations. The digital signage device 104 may be controlled by a computing device (e.g., a server) such as the computing device 102. The screen of the digital signage device 104 may be split into multiple zones to display multiple contents. In an example embodiment of the disclosure, the multiple zones may allow using the digital signage device 104 for multivariate testing in multi-zone layout.

The camera and sensor module 114 may be integrated or embedded in the digital signage device 104. The camera and sensor module 114 may be operable to capture and detect the presence of individuals such as the visitor 110 of the digital signage device 104. In an example embodiment of the disclosure, the camera and sensor module 114 may be operable to analyze captured video images utilizing video analytics, and track captured sensor information utilizing sensor tracking.

The computing device 102 may comprise suitable logic, circuitry, interfaces and/or code that may be operable to process information or data received from the digital signage device 104. For example, the computing device 102 (e.g., a server) may process information received from the camera and sensor module 114 in the digital signage device 104. In an example embodiment of the disclosure, the computing device 102 may be operable to perform analysis on the received information or data. Based on a result of the analysis, the computing device 102 may be operable to provide control of content display on the digital signage device through the CMS/player 106, for example. The computing device 102 may be operable to communicate the cloud computing platform 130 for pushing related content to the mobile device 108, for example. The computing device 102 may be operable to perform, utilizing the information or data received from the camera and sensor module 114 in the digital signage device 104, testing (e.g., A/B testing, multivariate testing) on various versions of certain content such as a particular advertisement displayed on the digital signage device 104, for example.

The content management server (CMS)/player 106 may comprise suitable logic, circuitry, interfaces and/or code that may be operable to store, manage and schedule content for display on the digital signage device 104. In an example embodiment of the disclosure, the CMS/player 106 may be operable to communicate or interface with the computing device 102 for determining content such as a particular advertisement to display or play.

The communication network 130 may comprise suitable logic, circuitry, interfaces, devices and/or code that may be operable to provide data and voice communication services to various devices and/or entities by using various wireless and/or wired communication technologies. The communication network 130 may comprise, for example, the Internet, a cellular network and/or other multimedia network. In an example embodiment of the disclosure, the communication network 130 may be operable to provide communications among the computing device 102 and the mobile device 108. The communication network 103 may provide cloud computing platform services such as the cloud computing platform 131.

The mobile device 108 may comprise suitable logic, circuitry, interfaces and/or code that may be operable to communicate signals wirelessly across the communication network 130. The mobile device 108 may be operable to process data or signals. In this regard, the mobile device 108 may comprise a camera (not shown), one or more various sensors such as the accelerometer 119 and one or more applications such as the particular application 118 running on the mobile device 108. The mobile device 108 may comprise, for example, a smart phone, a mobile phone, a tablet and/or other similar type of computing device.

In operation, the visitor 110 may visit the digital signage device 104 and may trigger the camera and sensor module 114 in the digital signage device 104 to capture or collect relevant information associated with the visitor 110. In this regard, the camera and sensor module 114 may be operable to perform analysis on captured video images utilizing a video analytics, and generate characteristic information associated with the visitor 110 for transmitting to the computing device 102. The computing device 102, which may be operatively coupled to the digital signage device 104, may be operable to receive, from the camera and sensor module 114, the characteristic information associated with the visitor 110. The received characteristic information may be analyzed by the computing device 102, and based on a result of the analysis of the characteristic information, advertisement attributes may be determined. The determined advertisement attributes may be used to generate bid requirements for soliciting advertisement bids, for example, in real time. The computing device 102 may be operable to select, based on the determined advertisement attributes, a particular advertisement from among a plurality of advertisement bids. In this regard, for example, the selected particular advertisement may be a winning bid among the considered plurality of advertisement bids. The computing device 102 may then be operable to cause display of the selected particular advertisement on the digital signage device 104 for the visitor 110 to view and/or interact. In this regard, for example, the computing device 102 may be operable to communicate the selected particular advertisement to the CMS/player 106 for scheduling a display of the selected particular advertisement on the digital signage device 104.

The characteristic information associated with the visitor 110 may comprise, for example, one or more of the following: demographic information of the visitor 110, behavioral information of the visitor 110, and location information of the visitor 10 in a field-of-view captured by the camera and sensor module 114 in the digital signage device 104. In this regard, the demographic information may comprise, for example, age, gender, ethnicity, etc. The behavioral information may comprise, for example, worn/carried items, facial signatures, visual cues, etc.

In response to viewing the particular advertisement displayed on the digital signage device 104, the visitor 110 may input one or more gestures 112 to the mobile device 108. For example, the gesture(s) 112 may comprise one or more motion-based gestures (e.g., waving the mobile device 108) inputted to the mobile device 108, and the mobile device 108 may detect the motion-based gesture(s) utilizing the accelerometer 119. The mobile device 108 may be operable to communicate, based on the detecting of the one or more motion-based gestures, location information and particular profile information associated with the mobile device 108 to the cloud computing platform 131, utilizing the particular application 118 running on the mobile device 108. In the mean time, the camera and sensor module 114 may be operable to capture and detect the gesture(s) 112 inputted to the mobile device 108 and utilizing the video analytics on captured video images to generate particular gesture information (e.g., information on the motion-based gesture(s)) associated with the mobile device 108. The computing device 102 may be operable to receive, from the camera and sensor module 114, the particular gesture information associated with a mobile device 108. The computing device 102 may be operable to communicate, based on the received particular gesture information, to the cloud computing platform 131 for causing the cloud computing platform 131 to obtain the location information and the particular profile information associated with the mobile device 108, from the mobile device 108.

Based on the obtained location information and the particular profile information, the cloud computing platform 131 may be operable to push content associated with the displayed particular advertisement into the mobile device 108 for the visitor 110 to either place an order on the mobile device 108 or for the mobile device 108 to automatically complete a transaction utilizing the particular application 118 running on the mobile device 108. In this regard, for example, the mobile device 108 may be configured so that the particular profile information comprises a set-up to allow the mobile device 108 to automatically complete the transaction (e.g., purchase of an item advertised on the digital signage device 104) based on just "one gesture" inputted to the mobile device 108 (e.g., waving the mobile device 108) in front of the digital signage device 104.

In instances when the visitor 110 is in front of the digital signage device 104 which is displaying a first version of the particular advertisement, the camera and sensor module 114 may be operable to capture and detect one or more actions of the visitor 110. The camera and sensor module 114 may be operable to generate, based on the captured/detected action(s), action information associated with the visitor 110, utilizing one or both of (1) a video analytics on video images captured by the camera and sensor module 114 and (2) a tracking on sensor information captured by the camera and sensor module 114. The computing device 102 may be operable to perform testing (e.g., A/B testing, multivariate testing) which may comprise (1) receiving, from the camera and sensor module 114, the action information associated with the visitor 110 who views the first version of the displayed particular advertisement, (2) analyzing statistically the received action information associated with the first version of the particular advertisement and other received action information associated with the first version as well as associated with one or more other versions of the particular advertisement, and (3) determining, based on a result of the analysis of the action information, a particular version among the first version and the one or more other versions for display on the digital signage device 104 when the particular advertisement may be later scheduled to display.

In this regard, the action information which is statistically analyzed may comprise, for example, one or more of audience impression, viewing time, viewer facial gesture (or expression) and viewer interaction. For example, the viewer interaction may comprise conversion related actions such as scanning a barcode (e.g., a QR code) using the mobile device 108, downloading a coupon using the mobile device 108, placing an order using the mobile device 108, etc. For example, the camera and sensor module 114 may track the barcode-scanning and/or the coupon-downloading utilizing a pixel tracking. Example A/B testing and multivariate testing are further described below with reference to FIG. 3.

Figure 2:
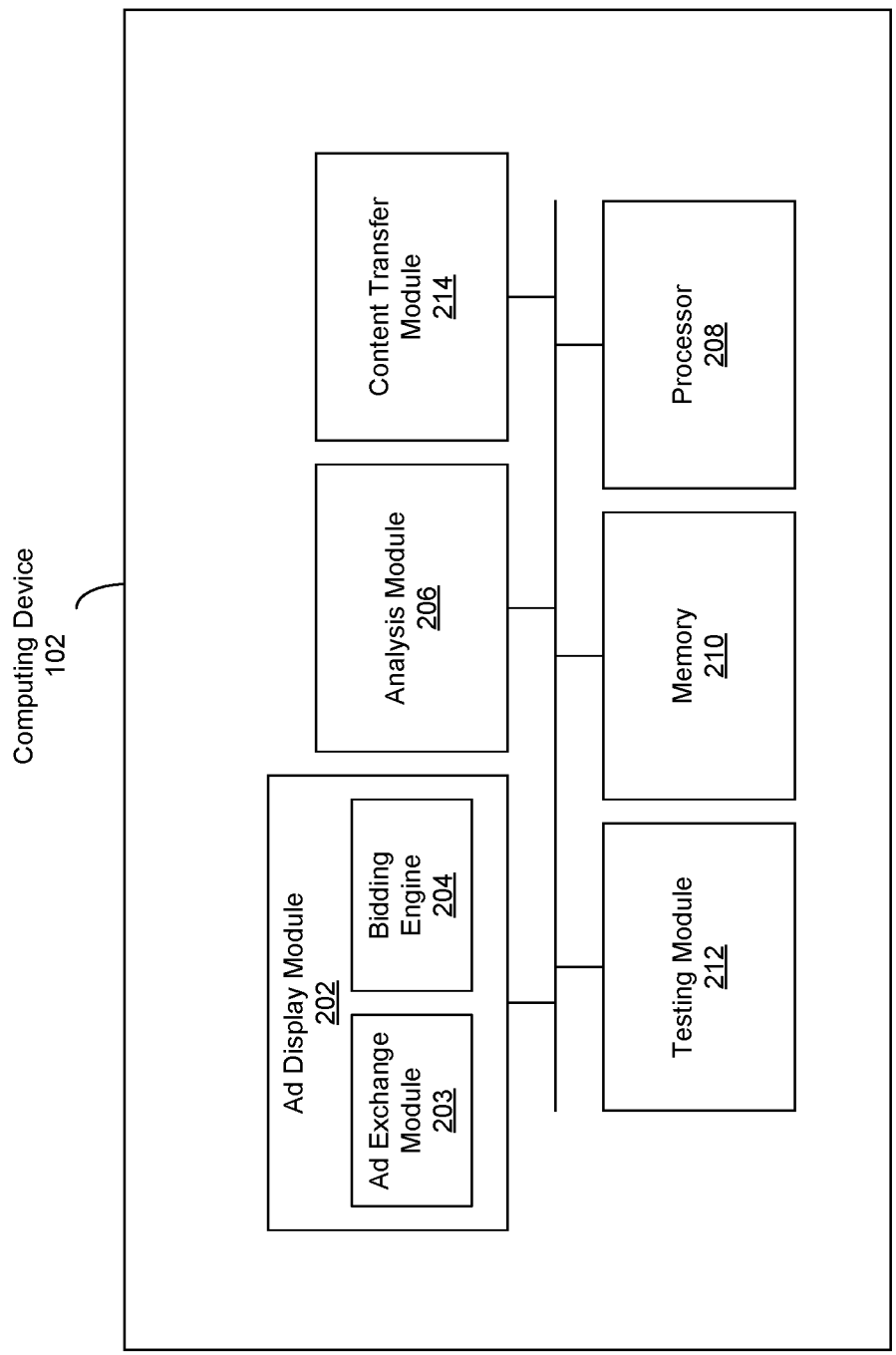
FIG. 2 is a block diagram illustrating an example computing device that is operable to provide gesture-based cross channel commerce and marketing, in accordance with an example embodiment of the disclosure.

FIG. 2 is a block diagram illustrating an example computing device that is operable to provide gesture-based cross channel commerce and marketing, in accordance with an example embodiment of the disclosure. Referring to FIG. 2, there is shown the computing device 102 as described with respect to FIG. 1, for example. The computing device 102 (e.g., a server) may comprise, for example, an ad display module 202, an analysis module 206, a content transfer module 214, a testing module 212, a processor 208 and a memory 210. The ad display module 202 may comprise, for example, an ad exchange module 203 and a bidding engine 204.

The processor 208 may comprise suitable logic, circuitry, interfaces and/or code that may be operable to manage and/or control operations of various components and/or modules in the computing device 102. The processor 208 may utilize an operating system (OS) that enables the execution of various applications.

The memory 210 may comprise suitable logic, circuitry, interfaces and/or code that may be operable to store information such as executable instructions and/or data that may be utilized by the processor 208, the ad display module 202, the analysis module 206, the content transfer module 214, the testing module 212 and/or other modules or components in the computing device 102. The memory 210 may comprise RAM, ROM, low latency nonvolatile memory such as flash memory and/or other suitable electronic data storage.

The ad display module 202 may comprise suitable logic, circuitry, interfaces and/or code that may be operable to perform advertisement bidding and display functions for the computing device 102. For example, the ad display module 202 may be operable to facilitate bidding, selling and purchasing on online advertisement inventory, utilizing the ad exchange module 203. The ad display module 202 may be operable to, in real time, process bidding information and coordinate information flow to various subsystems or modules including the ad exchange module 203, a digital signal processor (DSP), etc., utilizing the bidding engine 204, for example. In this regard, the bidding engine 204 may perform, for example in real time, conducting auction among a plurality of advertisement bids from one or more advertisers and determining a wining advertisement for display on the digital signage device 104.

The analysis module 206 may comprise suitable logic, circuitry, interfaces and/or code that may be operable to perform analysis functions for the computing device 102. For example, the analysis module 206 may be operable to receive certain information or data received from the camera and sensor module 114 in the digital signage device 104, and perform analysis on the received information or data for providing control actions to the digital signage device 104.

The content transfer module 214 may comprise suitable logic, circuitry, interfaces and/or code that may be operable to communicate with the cloud computing platform 131 to initiate a push or transfer of content associated with a particular advertisement (displayed on the digital signage device 104) into a mobile device such as the mobile device 108, by the cloud computing platform 131.

The testing module 212 may comprise suitable logic, circuitry, interfaces and/or code that may be operable to perform testing functions for the computing device 102. In an example embodiment of the disclosure, the testing module 212 may be operable to perform testing on advertisements displayed on the digital signage device 104 for the computing device 102. in this regard, the testing may comprise, for example, an A/B testing or a multivariate testing.

In operation, the ad display module 202 in the computing device 102 may be operable to receive, from the camera and sensor module 114 in the digital signage device 104, characteristic information associated with the visitor 110 of the digital signage device 104. The received characteristic information may be analyzed by the analysis module 206 in the computing device 102, and based on a result of the analysis of the characteristic information, advertisement attributes may be determined by the ad display module 202. The ad display module 202 may be operable to select, based on the determined advertisement attributes, a particular advertisement from among a plurality of advertisement bids. The ad display module 202 may then be operable to cause display of the selected particular advertisement on the digital signage device 104 for the visitor 110.

The content transfer module 214 in the computing device 102 may be operable to receive, from the camera and sensor module 114 in the digital signage device 104, particular gesture information associated with a mobile device such as the mobile device 108 of the visitor 110 who may respond to the displayed particular advertisement. The content transfer module 214 may be operable to communicate, based on the received particular gesture information, to a cloud computing platform such as the cloud computing platform 131 for causing the cloud computing platform 131 to obtain location information and particular profile information associated with the mobile device 108, from the mobile device 108. Based on the obtained location information and the particular profile information, the cloud computing platform 131 may be operable to push content associated with the displayed particular advertisement into the mobile device 108 for the visitor 110 to place an order on the mobile device 108 or for the mobile device 108 to automatically complete a transaction utilizing a particular application such as the application 118 running on the mobile device 108.

The computing device 102 may be operable to perform testing, utilizing the testing module 212, on the particular advertisement displayed on the digital signage device 104. In this regard, the testing module 212 may be operable to receive, from the camera and sensor module 114 in the digital signage device 104, action information associated with the visitor 110 who views a first version of the displayed particular advertisement. The analysis module 206 in the computing device 102 may be operable to analyze statistically the received action information associated with the first version of the particular advertisement and other received action information associated with the first version as well as associated with one or more other versions of the particular advertisement. The testing module 212 may then be operable to determine, based on a result of the analysis of the action information, a particular version among the first version and the one or more other versions for display on the digital signage device 104 when the particular advertisement may be later scheduled to display.

Figure 3:
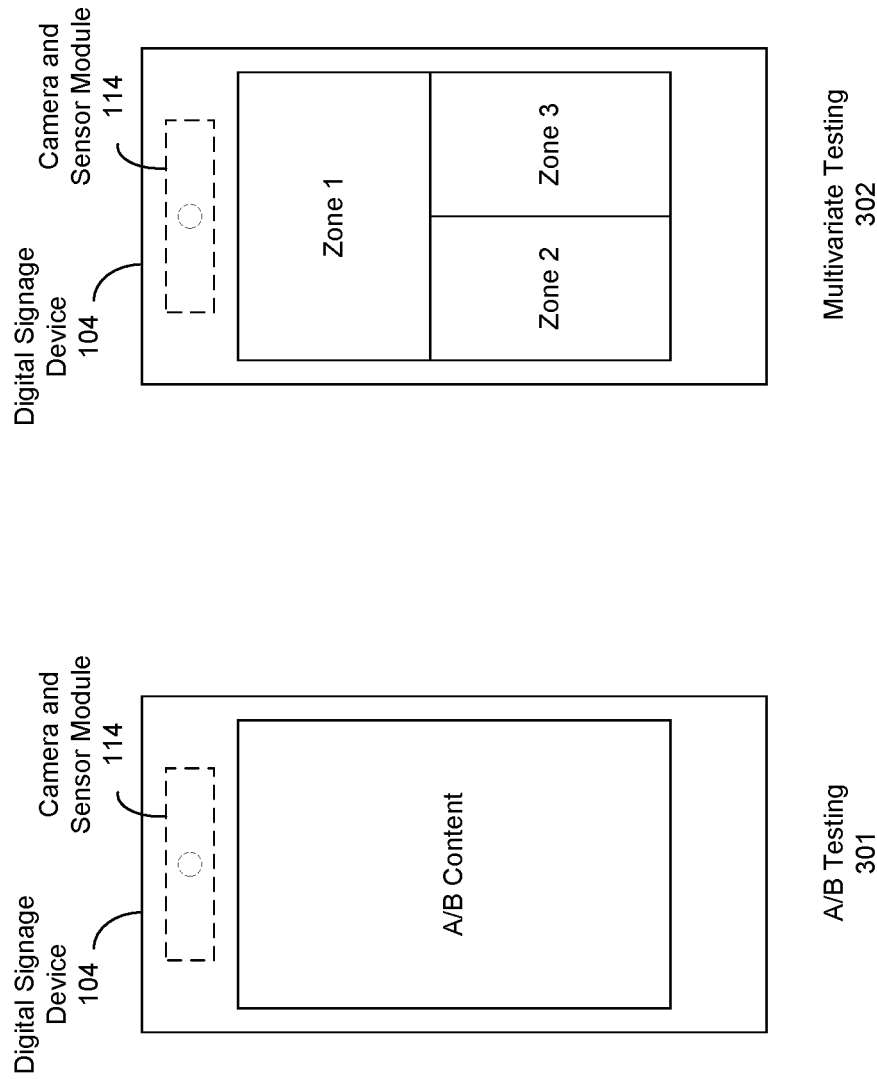
FIG. 3 is a block diagram illustrating example A/B testing and multivariate testing, in accordance with an example embodiment of the disclosure.

FIG. 3 is a block diagram illustrating example A/B testing and multivariate testing, in accordance with an example embodiment of the disclosure. Referring to FIG. 3, there is shown the digital signage device 104 and the integrated camera and sensor module 114. The digital signage device 104 and the camera and sensor module 114 may be as described with respect to FIG. 1, for example. There is also shown in FIG. 3 an A/B testing 301 which may comprise testing for A/B content (two versions). There is also shown in FIG. 3 a multivariate testing 302 which may comprise testing for content in a plurality of zones such as, for example, zone 1, zone 2 and zone 3.

Referring now to the A/B testing 301. In an example operation, when a visitor such as the visitor 110 is in front of the digital signage device 104 which is displaying a first version (version A) of the particular advertisement, the camera and sensor module 114 may be operable to capture and detect one or more actions of the visitor 110. The camera and sensor module 114 may be operable to generate, based on the captured/detected action(s), action information associated with the visitor 110 as described above with reference to FIG. 1. The testing module 212 in the computing device 102 may be operable to receive, from the camera and sensor module 114, the action information associated with the visitor 110 who views the first version of the displayed particular advertisement. The analysis module 206 in the computing device 102 may be operable to analyze statistically the received action information associated with the first version of the particular advertisement and other received action information (according to other visitor(s)) associated with the first version as well as associated with a second version (version B) of the particular advertisement. Based on a result of the analysis of the action information, the testing module 212 may be operable to determine a particular version among the first version and the second version for display on the digital signage device 104 when the particular advertisement may be later scheduled to display.

Referring now to the multivariate testing 302. In an example embodiment, the screen of the digital signage device 104 may comprise, for example, three zones (zone 1, zone 2, zone 3). In such instances, there may be 27 combinations to test (i.e., 27 versions). In an example operation, when a visitor such as the visitor 110 is in front of the digital signage device 104 which is displaying a first version (a first combination) of the particular advertisement, the camera and sensor module 114 may be operable to capture and detect one or more actions of the visitor 110. The camera and sensor module 114 may be operable to generate, based on the captured/detected action(s), action information associated with the visitor 110 as described above with reference to FIG. 1. The testing module 212 in the computing device 102 may be operable to receive, from the camera and sensor module 114, the action information associated with the visitor 110 who views the first version of the displayed particular advertisement. The analysis module 206 in the computing device 102 may be operable to analyze statistically the received action information associated with the first version of the particular advertisement and other received action information (according to other visitor(s)) associated with the first version as well as associated with the other versions (e.g., other 26 combinations) of the particular advertisement. Based on a result of the analysis of the action information, the testing module 212 may be operable to determine a particular version (e.g., a particular combination) among the tested versions (e.g., 27 combinations) for display on the digital signage device 104 when the particular advertisement may be later scheduled to display.

Figure 4:
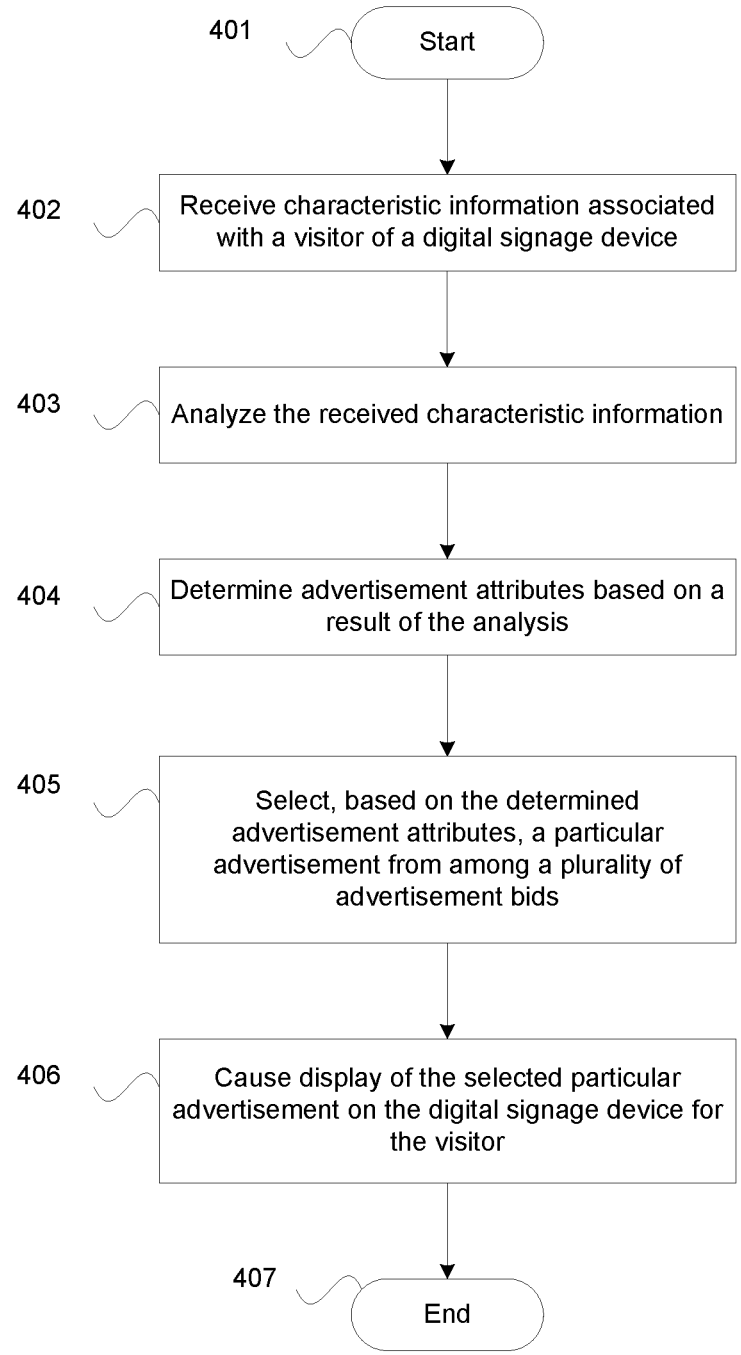
FIG. 4 is a flow chart illustrating example steps for gesture-based advertisement bidding and display, in accordance with an example embodiment of the disclosure.

FIG. 4 is a flow chart illustrating example steps for gesture-based advertisement bidding and display, in accordance with an example embodiment of the disclosure. Referring to FIG. 4, the example steps start at step 401. In step 402, the ad display module 202 in the computing device 102 may be operable to receive, from a camera and sensor module 114 in a digital signage device 104, characteristic information associated with a visitor 110 of the digital signage device 104. In step 403, the received characteristic information may be analyzed by the analysis module 206 in the computing device 102. In step 404, based on a result of the analysis of the characteristic information, advertisement attributes may be determined by the ad display module 202. In step 405, the ad display module 202 may be operable to select, based on the determined advertisement attributes, a particular advertisement from among a plurality of advertisement bids. In step 406, the ad display module 202 may then be operable to cause display of the selected particular advertisement on the digital signage device 104 for the visitor 110 to view. The example steps may proceed to the end step 407.

Figure 5:
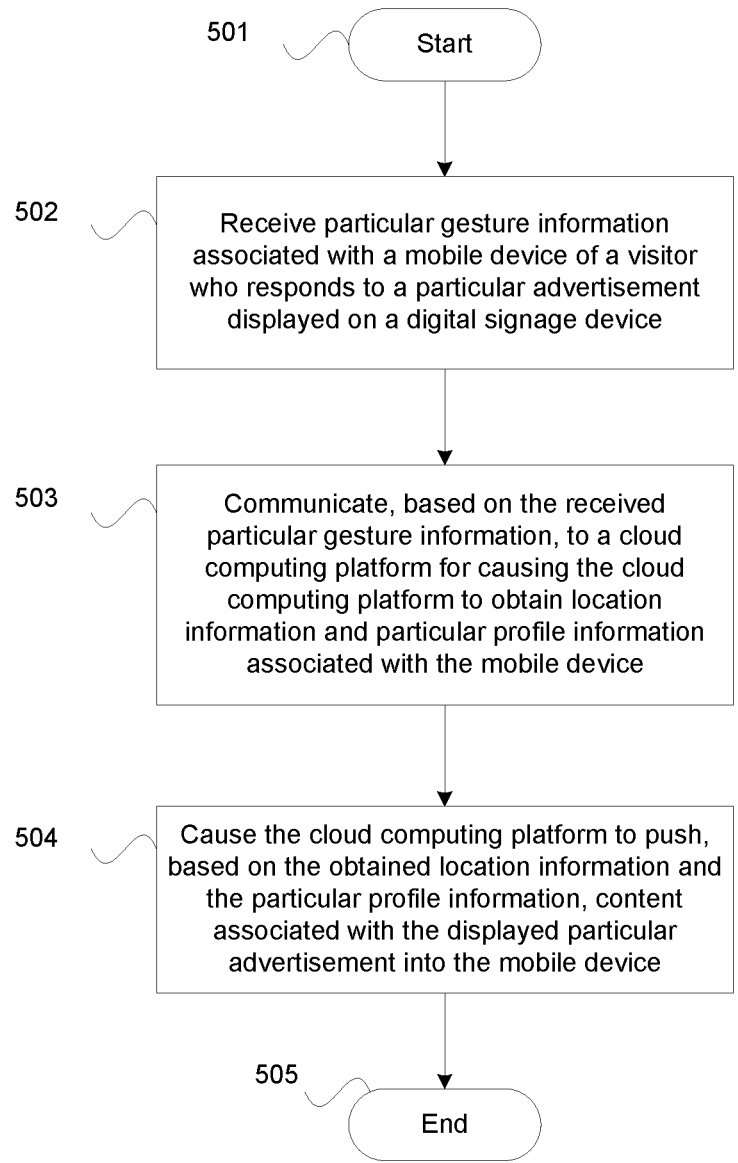
FIG. 5 is a flow chart illustrating example steps for gesture-based content transfer or transaction, in accordance with an example embodiment of the disclosure.

FIG. 5 is a flow chart illustrating example steps for gesture-based content transfer or transaction, in accordance with an example embodiment of the disclosure. Referring to FIG. 5, the example steps start at step 501. In step 502, the content transfer module 214 in the computing device 102 may be operable to receive, from a camera and sensor module 114 in a digital signage device 104, particular gesture information associated with a mobile device 108 of a visitor 110 who may respond to a particular advertisement displayed on the digital signage device 104. In step 503, the content transfer module 214 may be operable to communicate, based on the received particular gesture information, to a cloud computing platform such as the cloud computing platform 131 for causing the cloud computing platform 131 to obtain location information and particular profile information associated with the mobile device 108, from the mobile device 108. In step 504, the content transfer module 214 may be operable to cause the cloud computing platform 131 to push, based on the obtained location information and the particular profile information, content associated with the displayed particular advertisement into the mobile device 108 for the visitor 110 to place an order on the mobile device 108 or for the mobile device 108 to automatically complete a transaction utilizing a particular application such as the application 118 running on the mobile device 108. The example steps may proceed to the end step 505.

Figure 6:
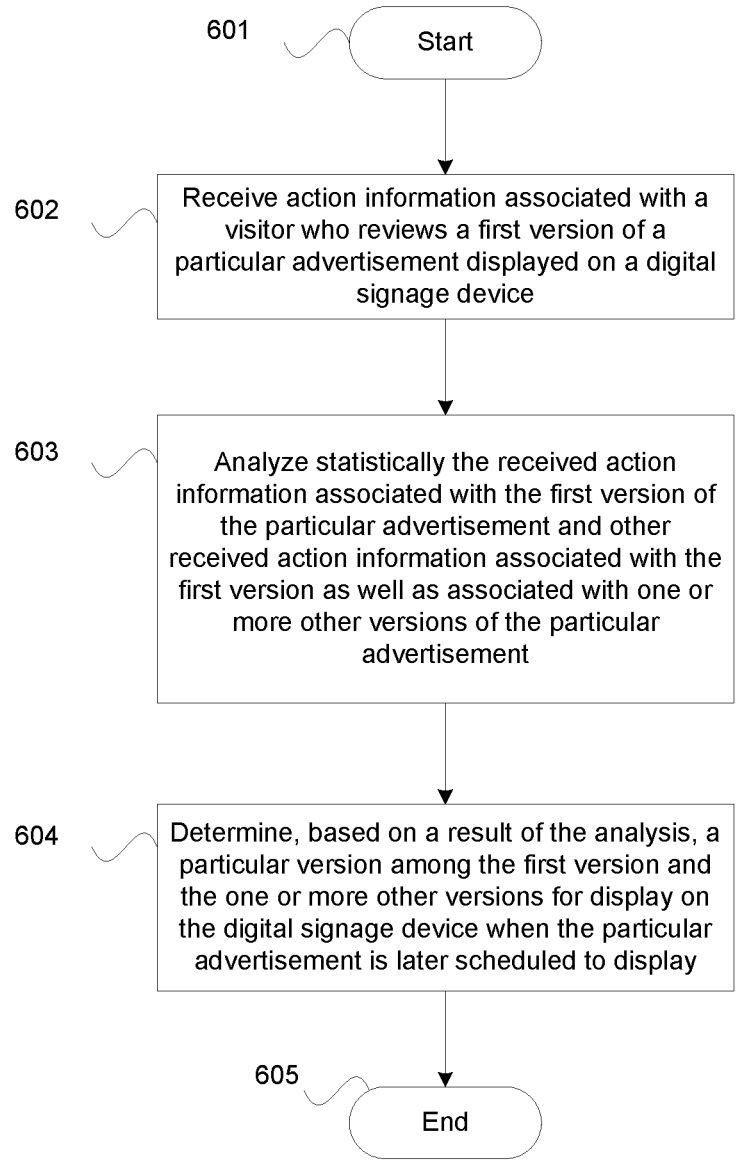
FIG. 6 is a flow chart illustrating example steps for gesture-based testing on advertisement, in accordance with an example embodiment of the disclosure.

FIG. 6 is a flow chart illustrating example steps for gesture-based testing on advertisement, in accordance with an example embodiment of the disclosure. Referring to FIG. 6, the example steps start at step 601. In step 602, the testing module 212 in the computing device 102 may be operable to receive, from a camera and sensor module 114 in a digital signage device 104, action information associated with a visitor 110 who views a first version of the displayed particular advertisement. In step 603, the analysis module 206 in the computing device 102 may be operable to analyze statistically the received action information associated with the first version of the particular advertisement and other received action information associated with the first version as well as associated with one or more other versions of the particular advertisement. In step 604, the testing module 212 may then be operable to determine, based on a result of the analysis of the action information, a particular version among the first version and the one or more other versions for display on the digital signage device 104 when the particular advertisement may be later scheduled to display. The example steps may proceed to the end step 605.

In various embodiments of the disclosure, a computing device 102 may be operatively coupled to a digital signage device 104. An ad display module 202 in the computing device 102 may be operable to receive, from a camera and sensor module 114 in the digital signage device, characteristic information associated with a visitor 110 of the digital signage device 104. The received characteristic information may be analyzed by an analysis module 206 in the computing device 102, and based on a result of the analysis of the characteristic information, advertisement attributes may be determined by the ad display module 202. The ad display module 202 may be operable to select, based on the determined advertisement attributes, a particular advertisement from among a plurality of advertisement bids. The ad display module 202 may then be operable to cause display of the selected particular advertisement on the digital signage device 104 for the visitor 110. In this regard, the characteristic information associated with the visitor 110 may comprise, for example, one or more of the following: demographic information of the visitor 110, behavioral information of the visitor 110, and location information of the visitor 110 in a field-of-view captured by the camera and sensor module 114 in digital signage device 104. The characteristic information may be generated by the camera and sensor module 114 utilizing, for example, a video analytics on video images captured by the camera and sensor module 114.

A content transfer module 214 in the computing device 102 may be operable to receive, from the camera and sensor module 114 in the digital signage device 104, particular gesture information associated with a mobile device 108 of the visitor 110 who may respond to the displayed particular advertisement. The content transfer module 214 may be operable to communicate, based on the received particular gesture information, to a cloud computing platform 131 (in a communication network 130) for causing the cloud computing platform 131 to obtain location information and particular profile information associated with the mobile device 108, from the mobile device 108. Based on the obtained location information and the particular profile information, the cloud computing platform 131 may be operable to push content associated with the displayed particular advertisement into the mobile device 108 for the visitor 110 to place an order on the mobile device 108 or for the mobile device 108 to automatically complete a transaction utilizing a particular application 118 running on the mobile device 108. In this regard, the gesture information associated with the mobile device 108 may be generated by the camera and sensor module 114 in the digital signage device 104 utilizing a video analytics on video images captured by the camera and sensor module 114. The gesture information associated with the mobile device 108 may comprise, for example, information on one or more motion-based gestures inputted to the mobile device 108. In such instances, the mobile device 108 may detect the one or more motion-based gestures utilizing an accelerometer 119 in the mobile device 108, and communicate, based on the detecting of the one or more motion-based gestures, the location information and the particular profile information to the cloud computing platform 131, utilizing the particular application 118 running on the mobile device 108.

The computing device 102 may be operable to perform testing, utilizing a testing module 212 in the computing device 102, on the particular advertisement displayed on the digital signage device 104. In this regard, the testing module 212 may be operable to receive, from the camera and sensor module 114 in the digital signage device 104, action information associated with the visitor 110 who views a first version of the displayed particular advertisement. The analysis module 206 in the computing device 102 may be operable to analyze statistically the received action information associated with the first version of the particular advertisement and other received action information associated with the first version as well as associated with one or more other versions of the particular advertisement. The testing module 212 may then be operable to determine, based on a result of the analysis of the action information, a particular version among the first version and the one or more other versions for display on the digital signage device 104 when the particular advertisement may be later scheduled to display. In this regard, the action information which is statistically analyzed may comprise one or more of audience impression, viewing time, viewer facial gesture and viewer interaction. The action information may be generated by the camera and sensor module 114 in the digital signage device 104 utilizing one or both of (1) a video analytics on video images captured by the camera and sensor module 114 and (2) a tracking on sensor information captured by the camera and sensor module 114.

Other embodiments of the disclosure may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for gesture-based cross channel commerce and marketing.

Accordingly, aspects of the present disclosure may be realized in hardware, software, or a combination of hardware and software. The present disclosure may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

Aspects of the present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method,
comprising: a mobile computing device for:
transmitting, via a first communication link, an accelerometer measurement generated by an accelerometer in the mobile computing device and associated with a particular motion-based gesture performed by a user of the mobile computing device;
transmitting, via a second communication link that is different than the first communication link, a location of the user and a profile of the user, wherein the location and the profile comprise information obtained from a particular application running on the mobile computing device;
receiving content associated with a particular advertisement; and
communicating with an advertisement system comprising a digital signage device and a computing device operatively coupled to the digital signage device,
a camera of the digital signage device for capturing an image of the user performing the particular motion-based gesture; and
the computing device for:
receiving, from the digital signage device, the captured image;
generating, according to video analytics applied to the image, particular gesture information associated with the mobile computing device; and
analyzing characteristic information associated with the user to select the particular advertisement from among a plurality of advertisements, according to an analysis of the user.

2. The method according to claim 1,
wherein the particular advertisement is displayed on the digital signage device.

3. The method according to claim 1, wherein the analysis of the user correspond to one or more of the following:
   demographic information;
   behavioral information; and
   location information in a field-of-view captured by the camera.

4. The method according to claim 1,
   wherein the analysis of the user comprises an analysis of video images captured by the camera.

5. The method according to claim 1, wherein the accelerometer measurement is associated with the motion-based gesture according to an analysis of video images captured by the camera.

6. The method according to claim 1, comprising:
   displaying a first version of the particular advertisement and a second version of
   the particular advertisement; and
   determining, based on a statistical analysis, whether the first version or the second version is displayed.

7. The method according to claim 1, wherein the location of the user and the profile of the user are associated with a particular application running on the mobile computing device.

8. The method according to claim 1, wherein a version of the particular advertisement is determined according to information associated with the user.

9. The method according to claim 8, wherein the information associated with the user comprises one or more of impression, viewing time, facial gestures and interaction.

10. The method according to claim 8,
    wherein the information associated with the user is based on one or both of:
    video images captured by the camera, and
    sensor information captured by a sensor of the digital signage device.

11. A system, comprising:
    an application for a mobile computing device, comprising a wireless interface for communicating via a first communication link and a second communication link that is different than the first communication link, configured to:
       transmit, via the first communication link, an accelerometer measurement generated by an accelerometer in the mobile computing device and associated with a particular motion-based gesture performed by a user of the mobile computing device;
       transmit, via the second communication link, a location of the user and a profile of the user, wherein the location and the profile comprise information obtained from the application; and
       receive content associated with a particular advertisement; and
       communicating with an advertisement system comprising a digital signage device and a computing device operatively coupled to the digital signage device,
    a camera of the digital signage device for capturing an image of the user performing the particular motion-based gesture; and
    the computing device for:
       receiving, from the digital signage device, the captured image;
       generating, according to video analytics applied to the image, particular gesture information associated with the mobile computing device; and
       analyzing characteristic information
          associated with the user to select the particular advertisement from among a plurality of advertisements, according to an analysis of the user.

12. The system according to claim 11,
    wherein the particular advertisement is displayed on the digital signage device.

13. The system according to claim 11,
    wherein the analysis of the user correspond to one or more of the following:
    demographic information;
    behavioral information; and
    location information in a field-of-view captured by the camera.

14. The system according to claim 11,
    wherein the analysis of the user comprises an analysis of video images captured by the camera.

15. The system according to claim 11, wherein the accelerometer measurement is associated with the motion-based gesture according to an analysis of video images captured by the camera.

16. The system according to claim 11, wherein a version of the particular advertisement is determined according to a statistical analysis.

17. The system according to claim 11, wherein the location of the user and the profile of the user are associated with a particular application running on the mobile computing device.

18. The system according to claim 11, wherein a version of the particular advertisement is determined according to information associated with the user.

19. The system according to claim 18, wherein the information associated with the user comprises one or more of impression, viewing time, facial gestures and interaction.

20. The system according to claim 18,
    wherein the information associated with the user is based on one or both of:
    video images captured by the camera, and
    sensor information captured by a sensor of the digital signage device.

* * * * *